United States Patent
Weliam et al.

(10) Patent No.: US 11,270,255 B2
(45) Date of Patent: Mar. 8, 2022

(54) ELECTRONIC SHELF LABEL USING VISIBLE LIGHT COMMUNICATIONS

(71) Applicant: Li-Tag, Miami, FL (US)

(72) Inventors: Amir Aboelezz Weliam, Cairo (EG); Tamer Sherif Ishak, Cairo (EG); Tony Micheal Attia, Cairo (EG)

(73) Assignee: Li-Tag LLC, Miami, FL (US)

( * ) Notice: Subject to any disclaimer, the term of this patent is extended or adjusted under 35 U.S.C. 154(b) by 203 days.

(21) Appl. No.: 16/273,455

(22) Filed: Feb. 12, 2019

(65) Prior Publication Data

US 2020/0258032 A1    Aug. 13, 2020

(51) Int. Cl.
| | |
|---|---|
| *G06Q 10/00* | (2012.01) |
| *G06Q 10/08* | (2012.01) |
| *G06F 3/147* | (2006.01) |
| *G06Q 20/20* | (2012.01) |

(52) U.S. Cl.
CPC ........... *G06Q 10/087* (2013.01); *G06F 3/147* (2013.01); *G06Q 20/201* (2013.01); *G09G 2380/04* (2013.01)

(58) Field of Classification Search
CPC .......................... G06Q 10/087; G06Q 20/201
USPC ...................................................... 705/16, 28
See application file for complete search history.

(56) References Cited

U.S. PATENT DOCUMENTS

2010/0106588 A1* 4/2010 Jones ................. G06Q 30/0223
705/14.24

OTHER PUBLICATIONS

Perkovic, et al., "BlinkComm: Initialization of IoT Devices Using Visibile Light Communication," Wireless Communications and Mobile Computing, vol. 2018, Jun. 2018.
Khan, "Visible Light Communication: Applications, Architecture, Standardization and Research Challenges," Digital Communications and Networks, vol. 3, No. 2, May 2017.
Karmore, et al., "Communication via LED," IOSR Journal of Computer Engineering, vol. 16, No. 2, Jan. 2014.

* cited by examiner

*Primary Examiner* — Rokib Masud
(74) *Attorney, Agent, or Firm* — CRGO Global; Steven M. Greenberg

(57) ABSTRACT

A method for ESL utilizing light communications includes selecting for ESL, a product stocked on shelf slotting space in a retail environment and querying a database with an identifier for the selected product and receiving in response to the querying, pricing data for the selected product. The method additionally includes selecting a frequency of communication above a specified strobe rate for a lighting system illuminating the retail environment and transmitting a directive to a controller for the lighting system directing the lighting system to communicate the pricing data to a shelf labeling module associated with the selected product. Thereafter, in response to the directive, the controller encodes the pricing data into a strobe pattern of the lighting system and activates the pattern thereby communicating the pricing data to the shelf labeling module which then decodes the pricing data from the strobe pattern and display the pricing data in a display.

17 Claims, 3 Drawing Sheets

ELECTRONIC SHELF LABEL USING VISIBLE LIGHT COMMUNICATIONS

BACKGROUND OF THE INVENTION

Field of the Invention

The present invention relates to the field of shelf labeling and more particularly to electronic shelf labeling.

Description of the Related Art

An electronic shelf labeling (ESL) system is a retail price display system used by retailers for displaying product pricing on shelving in respect to specific products. In ESL, a shelf labeling module is placed in proximity to slotting space for a product on the shelf and displays a contemporaneously established price, and optionally other information, for the product. Unlike conventional shelf labeling however, in ESL product pricing may be automatically updated whenever a price is changed by transmitting the pricing information to the shelf labeling module from a central control server causing the module to automatically update its display with the new pricing. Thus, ESL allows for rapid price changes for different products in the retail environment without undertaking a time-consuming manual effort using paper labels.

Typically, an electronic display module is attached to the front edge of retail shelving. The module generally includes a power supply, a small microprocessor or a microcontroller, memory and a display. The pricing for a corresponding product is then displayed on an LCD display of the module and the pricing is changed through wireless communication between the module and a remote server. Thus, each module must also include a wireless network communication adapter which can be an expensive component relative to the cost of the module as a whole.

BRIEF SUMMARY OF THE INVENTION

Embodiments of the present invention address deficiencies of the art in respect to ESL and provide a novel and non-obvious method, system and computer program product for ESL utilizing light communications. In an embodiment of the invention, a method for ESL utilizing light communications includes selecting for shelf labeling, a product stocked on shelf slotting space in a retail environment and querying a database with an identifier for the selected product and receiving in response to the querying, pricing data for the selected product. The method additionally includes selecting a frequency of communication above a specified strobe rate for a lighting system illuminating the retail environment and transmitting a directive to a controller for the lighting system directing the lighting system to communicate the pricing data to a shelf labeling module associated with the selected product. Thereafter, in response to the directive, the controller encodes the pricing data into a strobe pattern of the lighting system and activates the pattern so as to communicate the pricing data to the shelf labeling module, so that the shelf labeling module may then decode the pricing data from the strobe pattern and display the pricing data in a display of the shelf labeling module.

In one aspect of the embodiment, the lighting system is an LED lighting system and the strobe rate is one-hundred cycles per second. In another aspect of the embodiment, the strobe pattern includes an encoded identifier of the shelf labeling module that is unique to the shelf labeling module with respect to other shelf labeling modules in the retail environment. As such, the shelf labeling module enters a sleep mode for all encoded identifiers not associated therewith, but otherwise decodes the pricing data from the strobe pattern and displays the pricing data in a display of the shelf labeling module. In another aspect of the embodiment, the directive is encoded with the pricing data into a digital signal and modulated into an alternating current signal on a power transmission line powering the lighting system, so that the controller demodulates the alternating current signal on the power transmission line so as to extract therefrom the digital signal and decodes the digital signal into the directive and the pricing data.

In another embodiment of the invention, a data processing system configured for ESL utilizing light communications includes a host computing platform that includes one or more computers, each with memory and at least one processor. The system further includes a multiplicity of ESL modules affixed to different portions of different shelves in a retail environment. Each module includes a power supply, processor, memory, a display, an optical sensor, and firmware storing a computer program executing by the processor and detecting during execution, a photonic signal, determining from the signal whether or not a message has been specifically directed to the module. On the condition that the signal is determined to have been directed to the module, the module decodes a price from the signal and displays the decoded price in the display.

Notably, the system yet further includes an ESL management computer program. The program includes computer program instructions executing in the host computing platform. The computer program when the instructions execute select for shelf labeling, a product stocked on shelf slotting space in the shelves of the retail environment and query a database with an identifier for the selected product and receive in response to the querying, pricing data for the selected product. The program instructions further select a frequency of communication above a specified strobe rate for a lighting system illuminating the retail environment and transmit a directive to a controller for the lighting system directing the lighting system to communicate the pricing data to one of the ESL modules associated with the selected product. Finally, responsive to the directive, the controller encodes the pricing data into a strobe pattern of the lighting system and activates the pattern so as to communicate the pricing data to the one of the ESL modules.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for ESL utilizing light communications. In accordance with an embodiment of the invention, a product in a retail environment is identified for which a price change is to implemented. The new pricing information is received from a product database and a corresponding ESL module determined for the product. The new pricing information is then encoded along with a unique identifier and modulated onto a light wave signal of alternating illuminations and de-illuminations of a lighting system for the retail environment. The light wave signal is then applied to the lighting system so as to cause a strobing of different LED lights according to a pattern specified by the light wave signal. One of many different ESL modules affixed to different portions of shelving in the retail environment each sense the light wave signal through respectively different photodetectors and decode the modulated light wave signal, but only the ESL module corresponding to the unique identifier encoded in the light wave signal responds to the light wave signal by extracting therefrom the pricing information and displaying the pricing information in an associated display.

Figure 1:
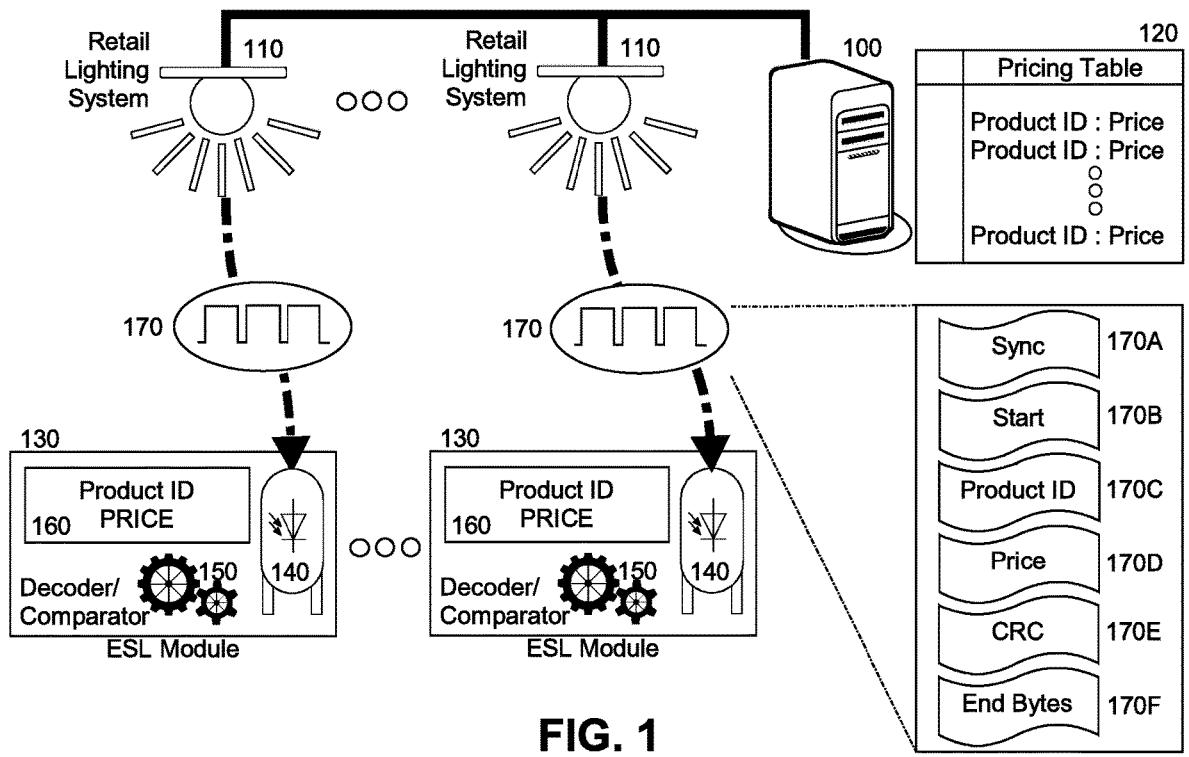
FIG. 1 is pictorial illustration of a process for ESL utilizing light communications.

In further illustration, FIG. 1 pictorially shows a process for ESL utilizing light communications. As shown in FIG. 1, a retail lighting system 110 of a retail environment can be coupled to a computing system 100 managing the signaling by the retail lighting system 110 of pricing information in respect to different products and correspondingly different prices disposed in a pricing table 120. Different ESL modules 130 disposed at different portions of retail shelving in the retail environment in correspondence to different respective products interacts with the signaling of the computing system 100 by the retail lighting system 110 in order to determine pricing information to be displayed in the ESL modules 130.

More specifically, each of the ESL modules 130 includes a photosensor 140 adapted to sense changes in ambient lighting level produced by the retail lighting system 110 so as to decode a signal 170 embedded therein. The signal 170 includes one or more start bytes 170A, a product identifier 170B, pricing information 170C and one or more end bytes 170D. That is to say, the start bytes 170 include a pattern of one or more bytes that, when received as part of the signal 170 in the photosensor 140, are decoded and processed to indicate that the bits of information in the signal 170 following the start bytes 170A are to be interpreted as information indicative of the product identifier 170B and the pricing information 170C. A decoder/comparator 150 in each of the ESL modules 130 then extracts from the signal 170 a product identifier 170B and compares the product identifier 170B to the identity of the corresponding one of the ESL modules 130. To the extent that the product identifier 170B matches the identity of the corresponding one of the ESL modules 130, the decoder/comparator 150 changes information in display 160 to reflect the pricing information 170C of the signal 170.

Thus, in operation, the computing system 100 determines a price change for a particular product with a particular product identifier in the table 120. The computing system 100 then encodes a signal 170 with the product identifier and pricing information and directs the retail lighting system 110 to modulate the signal 170 by switching from a one level of lighting to an ambient level of lighting and oppositely to represent high and low bits of a signal over a fixed course of time resulting in a carrier signal of particular frequency, which frequency should be greater than the strobe rate of the retail lighting system—for example 1,420 cycles per second in the case of an LED lighting system. As well the computing system 100 encodes the signal 170 to include, for example, initially two synchronization bytes 170A, followed by a start byte 170B which, when recognized by a state machine indicates a beginning of transmission, then a payload that includes the product identifier 170C and the pricing information 170D and concludes with an error-detection code byte 170E, and two end bits 170F which indicate an end to the transmission of the payload.

Upon detecting the start bytes 170B, each of the ESL modules 130 compares the encoded product identifier 170C to determine if the signal 170 is directed to an associated product. If not, the ESL module 130 remains in a sleep mode awaiting a next signal 170. But, if so, the ESL module 130 extracts the pricing information 170D and changes a display in the display 160 with the pricing information 170D. In this way, each of the ESL modules 130 communicates with the computing system 100 to receive price changes for associated products, not by unreliable and expensive network data communications, but by leveraging the existing infrastructure of the retail lighting system 110.

Figure 2:
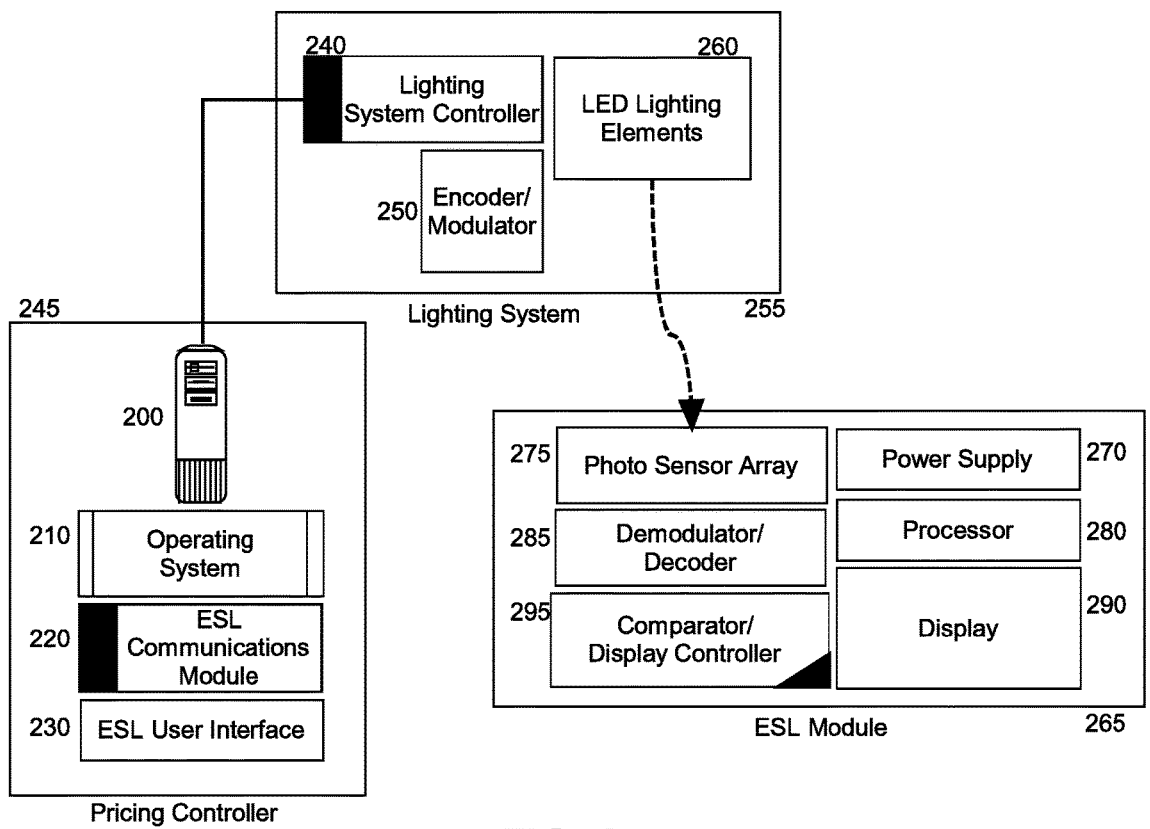
FIG. 2 is a schematic illustration of a data processing system adapted for ESL utilizing light communications.

The process described in connection with FIG. 1 may be implemented within a data processing system. In further illustration, FIG. 2 schematically shows a data processing system adapted for ESL utilizing light communications. The system includes a pricing controller 245 communicatively interacting with a retail lighting system 255 that in turn interacts with multiple different ESL modules 265 (only a single ESL module 265 shown for the purpose of illustrative convenience). The pricing controller includes a host computing platform that includes at least one processor and memory and hosts the execution of an operating system 210. The operating system 210 in turn hosts the operation of an ESL communications module 220 providing an ESL user interface 230.

The retail lighting system 255 in turn includes a lighting system controller 240 coupled to different LED lighting elements 260 and an encoder modulator 250. The LED lighting elements 260 include one or more LED lamps adapted to emit LED light at two different levels—an ambient level and a reduced level. The lighting system controller 240 is a computer program enabled to specify a level of lighting to be emitted by the LED lighting elements 260 based upon an encoding produced by encoder/modulator 250 which received binary data and encodes the binary data into a pattern of switching cycles of the LED lighting elements 260 between ambient levels and reduced levels in accordance with a particular frequency of transmission of information.

The ESL module 265 in turn includes a power supply 270, a processor 280 and a display 290. The ESL module 265 also includes a photo sensor adapted to detect different levels of light and to output a voltage based upon the detected levels of light over time to demodulator/decoder 285 which encodes the different output voltages into different digital representations of the ambient light or reduced levels of light so as to produce a binary string stored in a buffer. A comparator/display controller 295 in the ESL module 265 then processes the binary data in the buffer to extract therefrom a product identifier and pricing information. To the extent that the product identifier matches an identifier of the ESL module 265, the comparator/display controller 295 changes the display 290 to include the pricing information.

Figure 3:
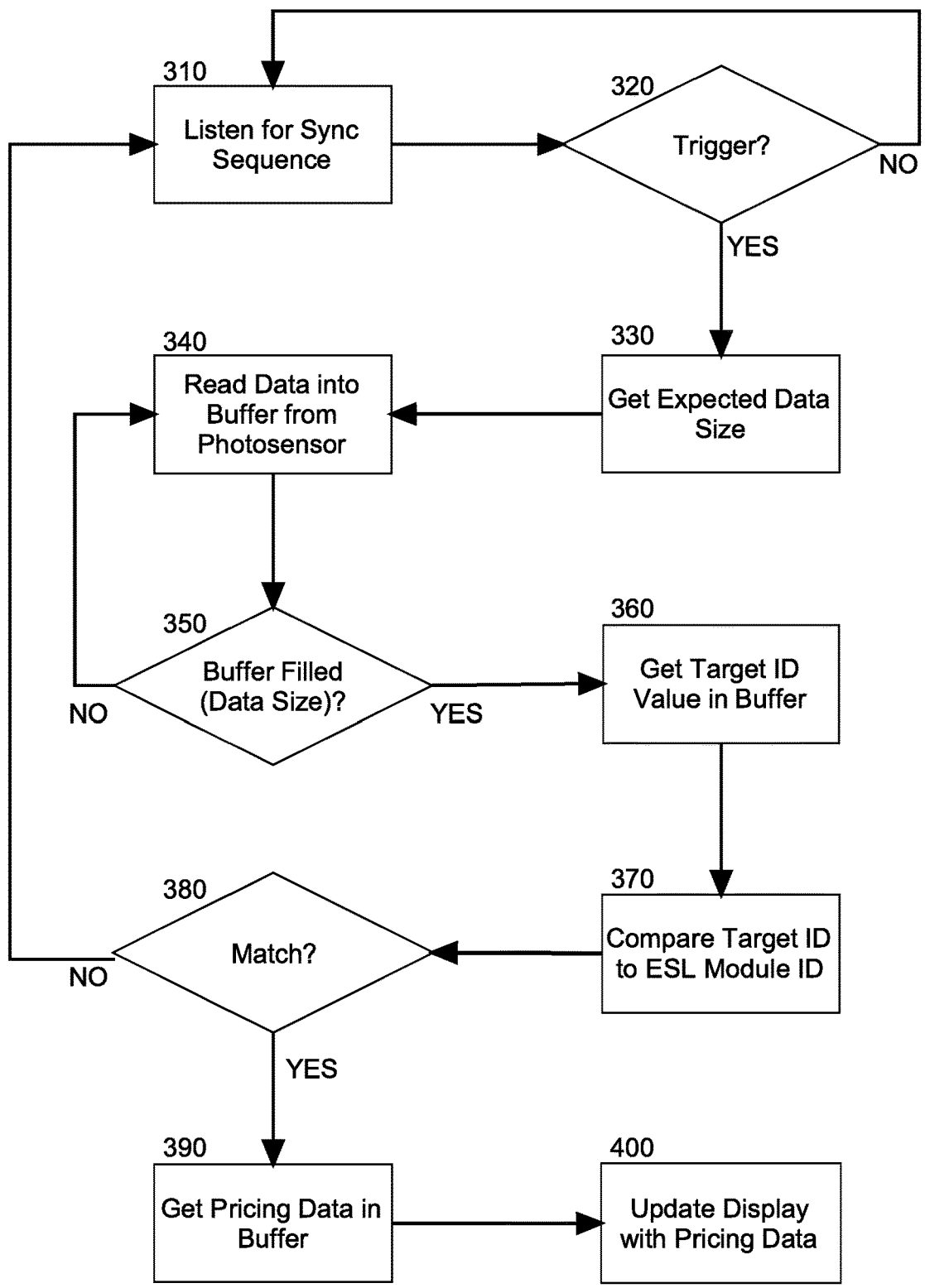
FIG. 3 is a flow chart illustrating a process for ESL utilizing light communications; and, FIG. 4 is a flow chart illustrating a process for ESL utilizing light communications with power savings mode.

In more particular illustration, in even yet further illustration of the operation of the comparator/display controller 295, FIG. 3 is a flow chart illustrating a process for ESL utilizing light communications. Beginning in block 310, the ESL module listens for a synchronization sequence in a signal modulated according to changes in ambient lighting level in a retail environment by a retail lighting system. In decision block 320, if it is determined that the synchronization sequence has been received, in block 330, an expected size of a data payload is extracted from the signal and in block 340, data is read from a buffer storing received data modulated in the signal. In decision block 350, it is determined if the buffer is completely filled in accordance with the expected data size. If so, in block 360, a target identifier in the signal is extracted and compared to an identifier for the ESL module in block 370. In decision block 380, it is determined if the target identifier and the identifier for the ESL module match. If so, in block 390, pricing data is extracted from the signal and in block 400, the display of the ESL module is updated to reflect the pricing data.

Figure 4:
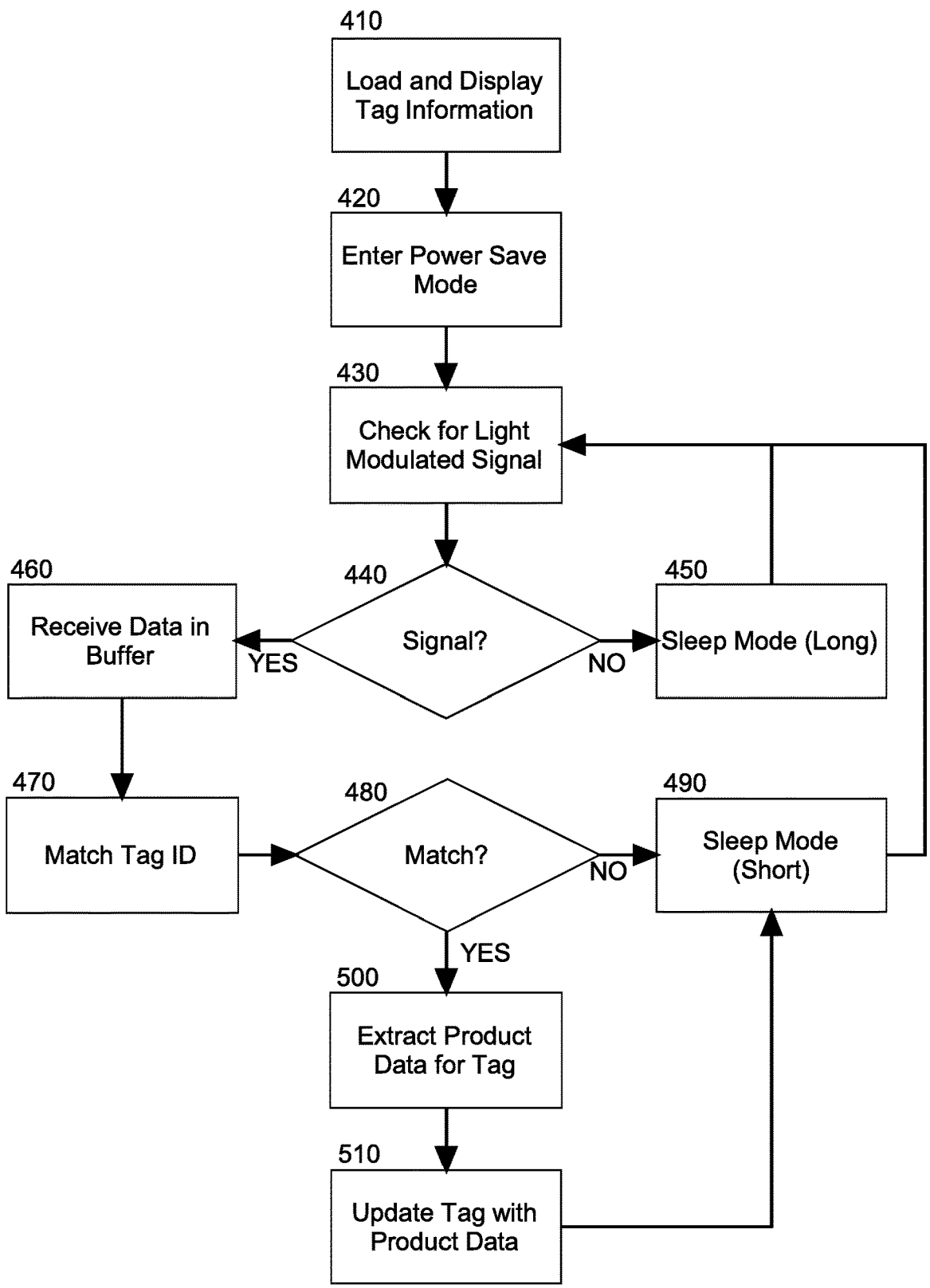

Of note, the process of FIG. 3 may be implemented utilizing a power savings mode in each of the ESL modules for energy conservation. In even yet further illustration, FIG. 4 is a flow chart illustrating a process for ESL utilizing light communications with a power savings mode. Beginning in block 410, in each ESL module in a retail environment, the ESL module information to be displayed is loaded and displayed so that the product data for each corresponding ESL module is displayed in connection with a product in store slotting space. In block 420, each ESL module then enters a power save mode in which each ESL module listens for a light modulated signal and displays product data, while reducing power to all non-essential components of the ESL module.

In block 430, each ESL module listens for the light modulated signal while in power save mode and in decision block 440, it is determined in each ESL module whether or not a light modulated signal has been detected. If not, in block 450 the ESL module enters a sleep mode of long duration, for instance five minutes duration before returning to block 430 and the power save mode. However, in decision block 440, if it is determined that a light modulated signal has been detected, in block 460 data is received from the light modulated signal into a buffer of the ESL module and the identifier of the data is matched to an identifier for the ESL module in block 470. In block 480, it is determined if the data is directed towards the ESL module and all ESL modules having an identifier not matching the identifier of the data enter a short sleep mode in block 490, for example for a duration of one minute, while the one ESL module with the identifier matching the identifier of the data extracts the product data for the ESL module in block 500 and updates the display of the ESL module with the product data before returning to the short sleep mode in block 490.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for electronic shelf labeling utilizing light communications comprising:
    selecting for shelf labeling, a product stocked on shelf slotting space in a retail environment;
    querying a database with an identifier for the selected product and receiving in response to the querying, pricing data for the selected product;
    selecting a frequency of communication above a specified strobe rate for a lighting system illuminating the retail environment;
    transmitting a directive to a controller for the lighting system directing the lighting system to communicate the pricing data to a shelf labeling module associated with the selected product; and,
    responsive to the directive, the controller encoding the pricing data into a strobe pattern of the lighting system by detecting with a photo sensor different levels of light and outputting a voltage based upon the detected levels of light over time to a demodulator/decoder which encodes the different output voltages into different digital representations of the ambient light or reduced levels of light so as to produce a binary string representative of the pricing data, and activating the pattern so as to communicate the pricing data to the shelf labeling module, the shelf labeling module decoding the pricing data from the strobe pattern and displaying the pricing data in a display of the shelf labeling module.

2. The method of claim 1, wherein the lighting system is an LED lighting system and the strobe rate is one-hundred cycles per second.

3. The method of claim 1, wherein the strobe pattern includes an encoded identifier of the shelf labeling module that is unique to the shelf labeling module with respect to other shelf labeling modules in the retail environment, the shelf labeling module entering a sleep mode for all encoded identifiers not associated therewith, but otherwise decoding the pricing data from the strobe pattern and displaying the pricing data in a display of the shelf labeling module.

4. The method of claim 1, wherein the directive is encoded with the pricing data into a digital signal and modulated into an alternating current signal on a power transmission line powering the lighting system, the controller demodulating the alternating current signal on the power transmission line so as to extract therefrom the digital signal and decoding the digital signal into the directive and the pricing data.

5. The method of claim 1, wherein the strobe pattern begins with at least one synchronization byte, followed by a start byte, and then a payload of an identifier and product data, followed by an error detection code byte and ending with at least one stop byte.

6. The method of claim 3, wherein the shelf labeling module enters a short sleep mode of a first duration of time for all encoded identifiers not associated therewith, and enters a long sleep mode of a second duration of time that is longer than the first duration of time in response to not detecting the strobe pattern of the lighting system while listening for the strobe pattern during a power saving mode in which the shelf labeling module provides limited power to listen for the strobe pattern.

7. A data processing system configured for electronic shelf labeling utilizing light communications, the system comprising:
    a host computing platform comprising one or more computers, each with memory and at least one processor;
    a multiplicity of electronic shelf labeling (ESL) modules affixed to different portions of different shelves in a retail environment, each module comprising a power supply, processor, memory, a display, a photosensor, and firmware storing a computer program executing by the processor and detecting during execution, a photonic signal, determining from the signal whether or not a message has been specifically directed to the module, and on condition that the signal is determined to have been directed to the module, decoding a price from the signal and displaying the decoded price in the display; and,
    an ESL management computer program comprising computer program instructions executing in the host computing platform, the computer program performing:
    selecting for shelf labeling, a product stocked on shelf slotting space in the shelves of the retail environment;
    querying a database with an identifier for the selected product and receiving in response to the querying, pricing data for the selected product;
    selecting a frequency of communication above a specified strobe rate for a lighting system illuminating the retail environment;
    transmitting a directive to a controller for the lighting system directing the lighting system to communicate the pricing data to one of the ESL modules associated with the selected product; and,
    responsive to the directive, the controller encoding the pricing data into a strobe pattern of the lighting system by detecting with a photo sensor different levels of light and outputting a voltage based upon the detected levels of light over time to a demodulator/decoder which encodes the different output voltages into different digital representations of the ambient light or reduced levels of light so as to produce a binary string representative of the pricing data, and activating the pattern so as to communicate the pricing data to the one of the ESL modules.

8. The system of claim 7, wherein the lighting system is an LED lighting system and the strobe rate is one-hundred cycles per second.

9. The system of claim 7, wherein the strobe pattern includes an encoded identifier of the one of the ESL modules that is unique to the one of the ESL modules with respect to others of the ESL modules in the retail environment, the one of the ESL modules entering a sleep mode for all encoded identifiers not associated therewith, but otherwise decoding the pricing data from the strobe pattern and displaying the pricing data in a display of the one of the ESL modules.

10. The system of claim 7, wherein the directive is encoded with the pricing data into a digital signal and modulated into an alternating current signal on a power transmission line powering the lighting system, the controller demodulating the alternating current signal on the power transmission line so as to extract therefrom the digital signal and decoding the digital signal into the directive and the pricing data.

11. The system of claim 7, wherein the strobe pattern begins with at least one synchronization byte, followed by a start byte, and then a payload of an identifier and product data, followed by an error detection code byte and ending with at least one stop byte.

12. A computer program product for electronic shelf labeling utilizing light communications, the computer program product including a computer readable storage medium having program instructions embodied therewith, the program instructions executable by a device to cause the device to perform a method including:
  selecting for shelf labeling, a product stocked on shelf slotting space in a retail environment;
  querying a database with an identifier for the selected product and receiving in response to the querying, pricing data for the selected product;
  selecting a frequency of communication above a specified strobe rate for a lighting system illuminating the retail environment;
  transmitting a directive to a controller for the lighting system directing the lighting system to communicate the pricing data to a shelf labeling module associated with the selected product; and,
  responsive to the directive, the controller encoding the pricing data into a strobe pattern of the lighting system by detecting with a photo sensor different levels of light and outputting a voltage based upon the detected levels of light over time to a demodulator/decoder which encodes the different output voltages into different digital representations of the ambient light or reduced levels of light so as to produce a binary string representative of the pricing data, and activating the pattern so as to communicate the pricing data to the shelf labeling module, the shelf labeling module decoding the pricing data from the strobe pattern and displaying the pricing data in a display of the shelf labeling module.

13. The computer program product of claim 12, wherein the lighting system is an LED lighting system and the strobe rate is one-hundred cycles per second.

14. The computer program product of claim 12, wherein the strobe pattern includes an encoded identifier of the shelf labeling module that is unique to the shelf labeling module with respect to other shelf labeling modules in the retail environment, the shelf labeling module entering a sleep mode for all encoded identifiers not associated therewith, but otherwise decoding the pricing data from the strobe pattern and displaying the pricing data in a display of the shelf labeling module.

15. The computer program product of claim 12, wherein the directive is encoded with the pricing data into a digital signal and modulated into an alternating current signal on a power transmission line powering the lighting system, the controller demodulating the alternating current signal on the power transmission line so as to extract therefrom the digital signal and decoding the digital signal into the directive and the pricing data.

16. The computer program product of claim 12, wherein the strobe pattern begins with at least one synchronization byte, followed by a start byte, and then a payload of an identifier and product data, followed by an error detection code byte and ending with at least one stop byte.

17. The computer program product of claim 14, wherein the shelf labeling module enters a short sleep mode of a first duration of time for all encoded identifiers not associated therewith, and enters a long sleep mode of a second duration of time that is longer than the first duration of time in response to not detecting the strobe pattern of the lighting system while listening for the strobe pattern during a power saving mode in which the shelf labeling module provides limited power to listen for the strobe pattern.

* * * * *